(No Model.)  5 Sheets—Sheet 1.

D. PRIETO.
MACHINE FOR DISINTEGRATING FIBROUS PLANTS.

No. 278,668. Patented May 29, 1883.

WITNESSES:
Fred. G. Dieterich.
Jno. G. Hinkel

INVENTOR.
Demetrio Prieto
by W. H. Doolittle
ATTORNEY (No Model.) 5 Sheets—Sheet 3.

D. PRIETO.
MACHINE FOR DISINTEGRATING FIBROUS PLANTS.

No. 278,668. Patented May 29, 1883.

WITNESSES:
Fred. G. Dieterich.
Jno. G. Hinkel

INVENTOR.
Demetrio Prieto
by M. H. Doolittle
ATTORNEY (No Model.) 5 Sheets—Sheet 4.

D. PRIETO.
MACHINE FOR DISINTEGRATING FIBROUS PLANTS.

No. 278,668. Patented May 29, 1883.

WITNESSES:
Fred G. Dieterich
Jno. G. Hinkel

INVENTOR.
Demetrio Prieto
by M. H. Doolittle
ATTORNEY

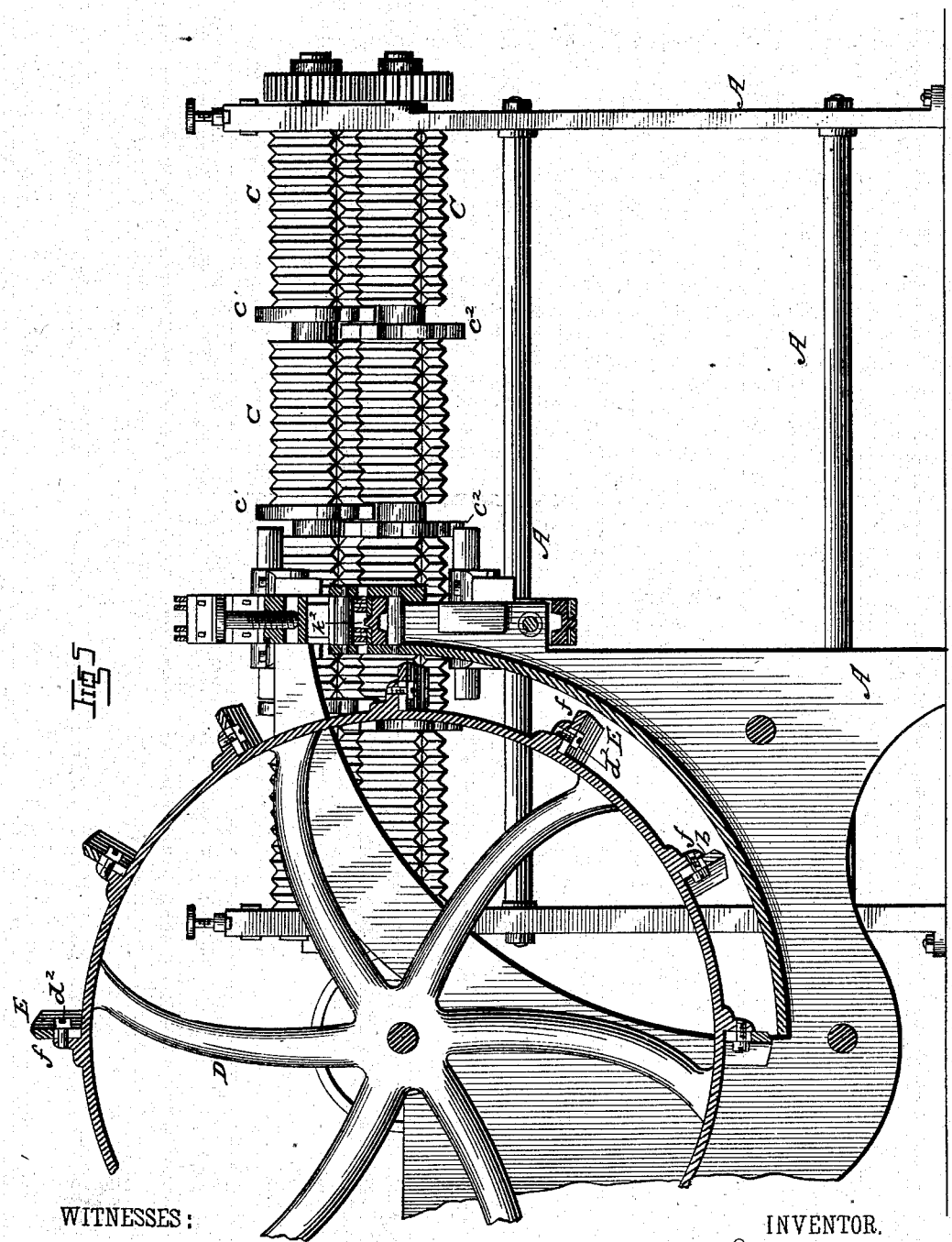

UNITED STATES PATENT OFFICE.

DEMETRIO PRIETO, OF MEXICO, REPUBLIC OF MEXICO.

MACHINE FOR DISINTEGRATING FIBROUS PLANTS.

SPECIFICATION forming part of Letters Patent No. 278,668, dated May 29, 1883.

Application filed May 7, 1883. (No model.) Patented in Mexico January 25, 1883.

*To all whom it may concern:*

Be it known that I, DEMETRIO PRIETO, a citizen of Spain, residing at Mexico, in the Republic of Mexico, have invented certain new and useful Improvements in a Machine for Disintegrating Fibrous Plants; and I do hereby declare the following to be a full, clear, and exact description of the invention, such as will enable others skilled in the art to which it appertains to make and use the same.

The object of my invention is to provide a new and improved machine for extracting the fiber from those plants the fiber of which is or may be used for commercial purposes, and to especially adapt it for use in cleaning those plants indigenous to tropical climates, and particularly of the bromelia and kindred classes.

It consists, in combination with a suitable frame, of a set of crushing groove-rollers, carrying-chains, friction-rollers, and scraping-knives, by which the plants are first broken or crushed, then carried to one set of knives, by which one part of the plant is scraped, and then to another set of knives, by which the remaining part is scraped and all matter removed except the fiber. It is illustrated in the accompanying drawings, in which—

Figure 1:
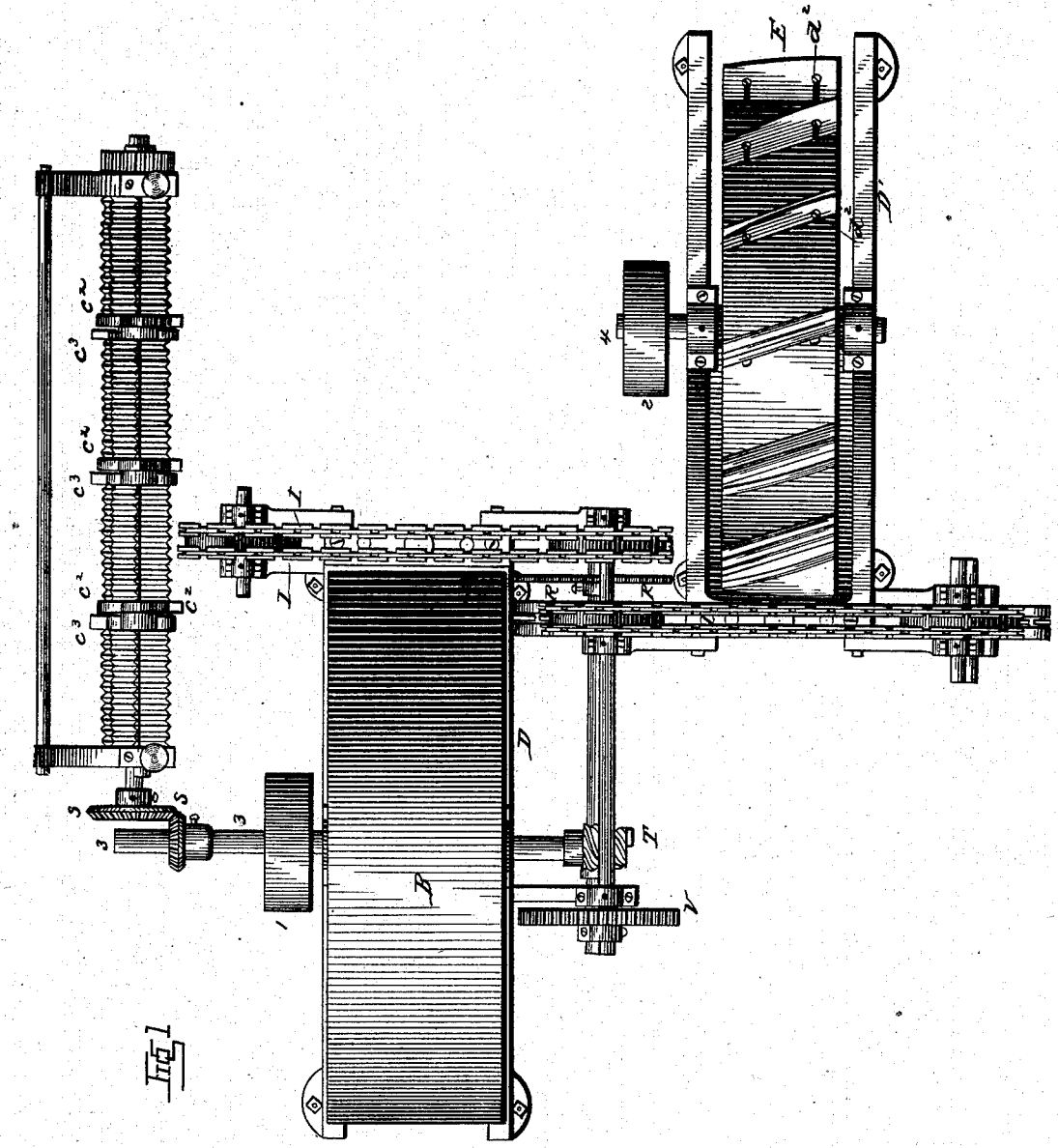
Figure 2:
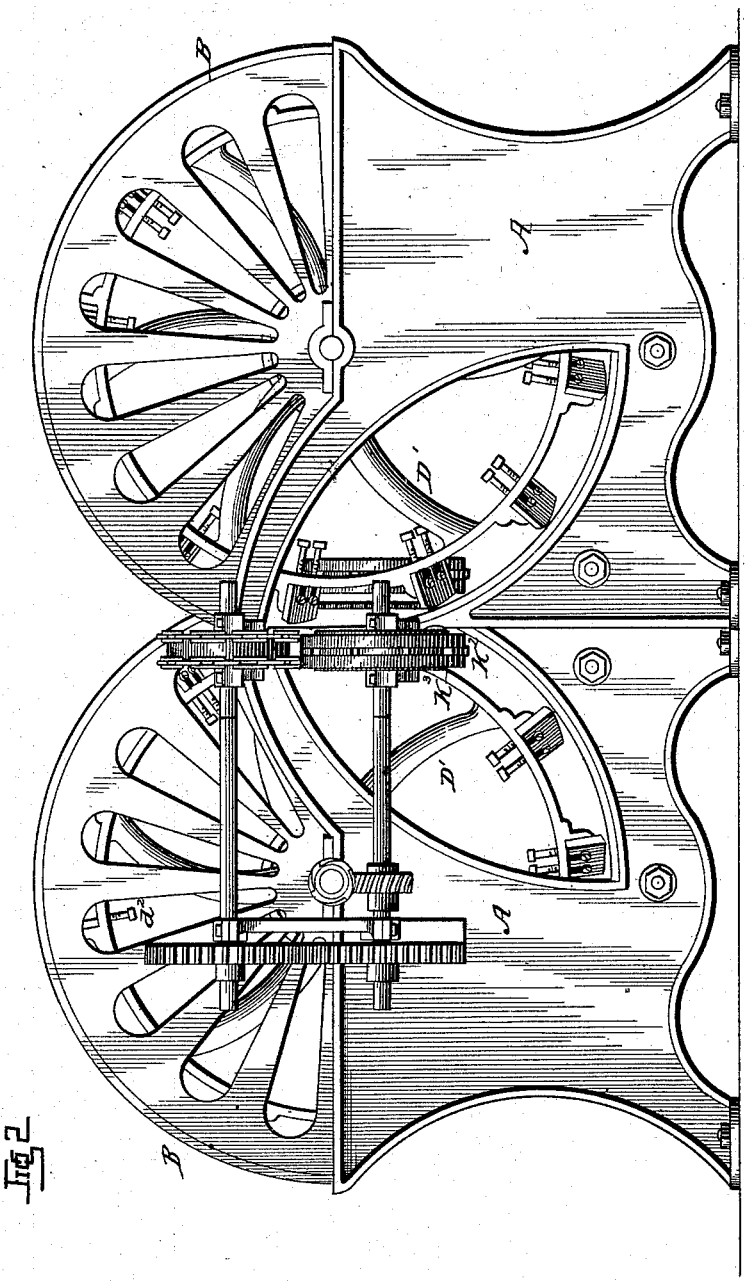
Figure 3:
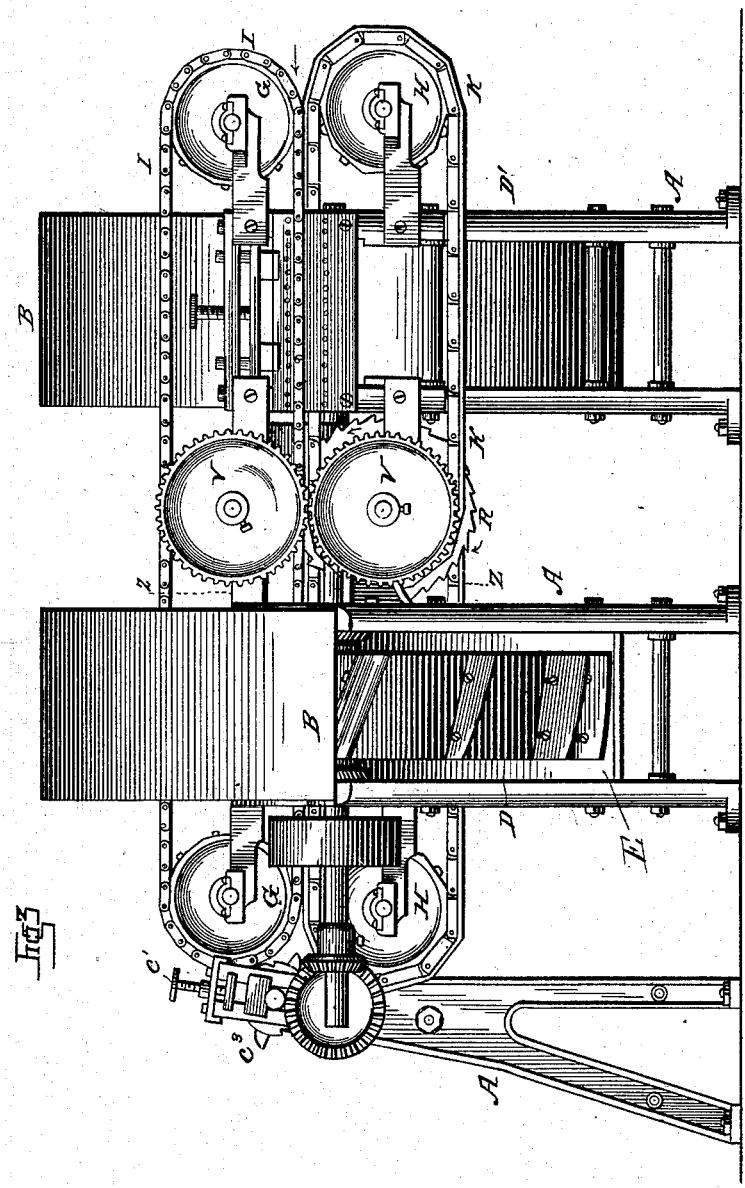
Figure 4:
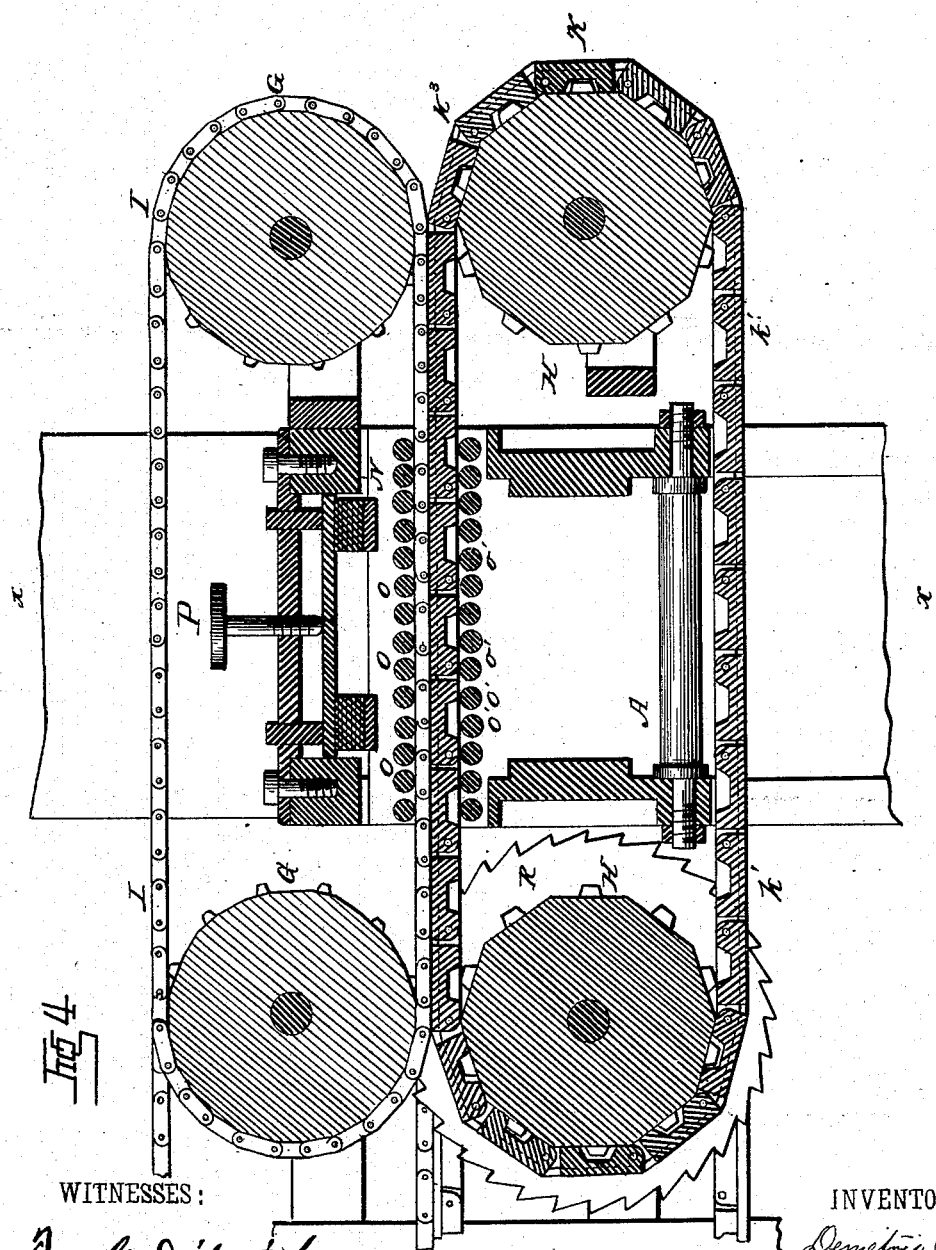

Figure 1 is a plan view; Fig. 2, an end view; Fig. 3, a front view; Fig. 4, an enlarged horizontal sectional view of a portion of the machine to the right of the line $z\ z$, Fig. 3; and Fig. 5, a side sectional view on line $x\ x$ of Fig. 4.

The same letters designate corresponding parts in the several views.

A is the frame of the machine; B B, removable covers of the bladed scraping-wheels, which covers are used to prevent the acid juices of the plants, as they are scraped, from being thrown on the operatives.

C C are adjustable crushing groove-rollers mounted on one side of the machine and revolving toward each other to crush the plants and carry them forward to the cleaning mechanism. They are adjusted vertically as to pressure by thumb-screw $c'$. On the shafts of the same rollers are secured disks $c^2$, having projecting teeth $c^3$. As the plants are fed lengthwise to the rollers C they are caught by the teeth $c^3$, which aid to guide and feed them through the crushing-rolls.

D D' are duplicate wheels located on opposite sides of the machine, and provided with scraping or scutching blades E, secured to brackets $f$, which brackets are bolted to or may be cast on the rims of the wheels. These blades are adjusted vertically by means of set-screws $d^2$.

G G H H are pin or sprocket wheels adapted to carry the link-chains I I and K. The chains I I are composed of open links; but the links $k'$ of lower chain, K, are closed, and are provided with recesses in their under surface for the reception of the pins on the wheels. The upper surface of said links is provided with a central rib, $k^2$, on both sides of which are secured rubber strips $k^3$. This rubber stripping acts as an elastic cushion for the chains I I and prevents the plants from being torn as the same are carried between the upper and lower set of chains.

O and $o'\ o'\ o'$ are small anti-friction rollers, between which the chains I I and K are carried. The upper set of rollers, O, have their bearings in a frame, N, which is adjustable vertically by thumb-screw P, by which the pressure of the carrying-chains upon the plants may be varied and controlled.

R is a circular disk having saw-teeth, and mounted on a shaft between the two wheels D D' to aid in carrying the plants from wheel D to wheel D'.

The actuating mechanism consists of pulleys 1 2, mounted on the shafts 3 4 of the scraping-wheels, and from which bands may be led to any suitable driving mechanism. Motion imparted to shaft 3 is communicated through bevel-gearing $s$ to the crushing-rolls, and also through worm T and cogs V to disk R, and the upper and lower chains, I I and K.

In the operation of dressing the plants they are presented, as already stated, lengthwise to the machine and carried between the crushing groove-rollers, then forward between the chains I I and K to the scraping-wheel D, where one end of the plant is stripped of all but its fiber by the blades E, then carried forward by the chains and the revolving blade R to the second wheel, D', where the opposite end of the plant is stripped, whereupon the operation is completed.

Having thus described my improvement, what I claim, and desire to secure by Letters Patent, is—

1. In a machine for disintegrating fibrous plants, the combination of the grooved adjustable crushing-rolls, the carrying yielding adjustable chains, the duplicate wheels, and their blades, whereby the plant is first partly crushed, then carried between the elastic supports, one end of the plant cleaned, and then carried forward and the remaining end cleaned, substantially as described.

2. In a machine for disintegrating fibrous plants, the combination of the adjustable groove crushing-rollers and the revolving disks and projecting teeth for feeding and crushing the plants, substantially as described.

3. In a machine for disintegrating fibrous plants, the combination, with suitable mechanism, of the sets of carrying-chains, one set provided with an elastic surface, substantially as and for the purpose described.

4. In a machine for disintegrating fibrous plants, the combination of the chains I and K and vertically-adjustable anti-friction rollers, substantially as and for the purpose described.

5. In a machine for disintegrating fibrous plants, the wheels D and D', provided with the adjustable blades E, and suitable mechanism for carrying the plants between said wheels, whereby one end of the plant is cleaned, and then the opposite end, substantially as described.

6. In a machine for disintegrating fibrous plants, the combination of the revolving toothed disk R and the carrying mechanism, substantially as described.

In testimony whereof I affix my signature in presence of two witnesses.

DEMETRIO PRIETO.

Witnesses:
L. A. SWARTZELL,
JOHN W. SIMS.